(12) United States Patent
Witte et al.

(10) Patent No.: US 11,963,477 B2
(45) Date of Patent: Apr. 23, 2024

(54) METHOD FOR OBSERVING WORKING PROCESSES OF AN AGRICULTURAL MACHINE, DIGITAL VIDEO SYSTEM AND AGRICULTURAL MACHINE

(71) Applicant: Grimme Landmaschinenfabrik GmbH & Co. KG, Damme (DE)

(72) Inventors: Markus Witte, Lohne (DE); Wolfram Strothmann, Osnabrück (DE); Axel Schomaker, Bohmte (DE)

(73) Assignee: Grimme Landmaschinenfabrik GmbH & Co. KG, Damme (DE)

( * ) Notice: Subject to any disclaimer, the term of this patent is extended or adjusted under 35 U.S.C. 154(b) by 14 days.

(21) Appl. No.: 17/622,016

(22) PCT Filed: Jun. 24, 2020

(86) PCT No.: PCT/EP2020/067760
§ 371 (c)(1),
(2) Date: Jul. 5, 2022

(87) PCT Pub. No.: WO2020/260427
PCT Pub. Date: Dec. 30, 2020

(65) Prior Publication Data
US 2022/0337785 A1    Oct. 20, 2022

(30) Foreign Application Priority Data
Jun. 24, 2019   (DE) .......................... 102019116961.5

(51) Int. Cl.
*A01D 33/00*   (2006.01)
*G06V 10/25*   (2022.01)
(Continued)

(52) U.S. Cl.
CPC ............. *A01D 33/00* (2013.01); *G06V 10/25* (2022.01); *G06V 20/52* (2022.01); *G11B 27/005* (2013.01);
(Continued)

(58) Field of Classification Search
CPC ........ A01D 33/00; G06V 10/25; G06V 20/52; G11B 27/005; H04N 5/2628; H04N 5/77; H04N 7/181
See application file for complete search history.

(56) References Cited

U.S. PATENT DOCUMENTS 9,345,194 B2   5/2016  Schroeder et al.
2009/0069986 A1   3/2009  Covington et al.
(Continued)

FOREIGN PATENT DOCUMENTS

CN   106888370 A   6/2017
DE   202008009834 U1   1/2010
(Continued)

*Primary Examiner* — Thai Q Tran
*Assistant Examiner* — Jose M Mesa
(74) *Attorney, Agent, or Firm* — Husch Blackwell LLP

(57) ABSTRACT

A method for observing the crop processing and/or handling working processes of an agricultural machine is provided. The method utilizes a digital video system with a plurality of digital image acquisition units, with at least one display unit and with at least one network coupling element preferably designed as a switch, via which the image acquisition units are connected to the display unit. The image acquisition units record image data for images of, in particular, a video stream, and at least one of the images, in particular of the video stream, is reproduced at least partially in one of in particular a plurality of configurable shapes comprising one or multiple image reproduction regions on the display unit that is in particular designed as a touchscreen of an EDP unit that is preferably designed as a Panel PC (8).

21 Claims, 6 Drawing Sheets

(51) Int. Cl.
  *G06V 20/52* (2022.01)
  *G11B 27/00* (2006.01)
  *H04N 5/262* (2006.01)
  *H04N 5/77* (2006.01)
  *H04N 7/18* (2006.01)

(52) U.S. Cl.
  CPC ............ *H04N 5/2628* (2013.01); *H04N 5/77* (2013.01); *H04N 7/181* (2013.01)

(56) References Cited

U.S. PATENT DOCUMENTS

| | | | |
|---|---|---|---|
| 2009/0147131 A1* | 6/2009 | Mikawa | G11B 27/34 348/E7.003 |
| 2011/0119716 A1* | 5/2011 | Coleman, Sr. | H04N 21/814 725/62 |
| 2011/0205084 A1 | 8/2011 | Morselli et al. | |
| 2014/0240506 A1 | 8/2014 | Glover et al. | |
| 2014/0325422 A1 | 10/2014 | Madsen et al. | |
| 2017/0112056 A1* | 4/2017 | Sierra | A01D 61/00 |
| 2018/0084719 A1* | 3/2018 | Neitemeier | G06T 7/269 |
| 2019/0116717 A1* | 4/2019 | Pauli | A01D 78/1085 |
| 2020/0128721 A1* | 4/2020 | Lewis | G01N 33/24 |

FOREIGN PATENT DOCUMENTS

| | | |
|---|---|---|
| DE | 102015115883 A1 | 3/2017 |
| EP | 3494773 A1 | 6/2019 |
| EP | 3437929 B1 | 4/2021 |
| JP | H0777965 A | 3/1995 |
| JP | 2005175701 A | 6/2005 |
| JP | 2008017529 A | 1/2008 |
| JP | 2008148158 A | 6/2008 |
| JP | 2010278757 A | 12/2010 |
| JP | 2011041504 A | 3/2011 |
| JP | 2011097309 A | 5/2011 |
| JP | 2011204089 A | 10/2011 |
| JP | 2012209731 A | 10/2012 |
| JP | 2013162406 A | 8/2013 |
| JP | 2014117243 A | 6/2014 |
| JP | 2015100075 A | 5/2015 |
| JP | 2015177332 A | 10/2015 |
| JP | 2016072727 A | 5/2016 |
| JP | 2019004841 A | 1/2019 |
| JP | 2019008766 A | 1/2019 |
| JP | 2019062348 A | 4/2019 |
| RU | 2568695 C1 | 11/2015 |
| RU | 2622700 C2 | 6/2017 |
| WO | 2014050180 A1 | 8/2016 |

* cited by examiner

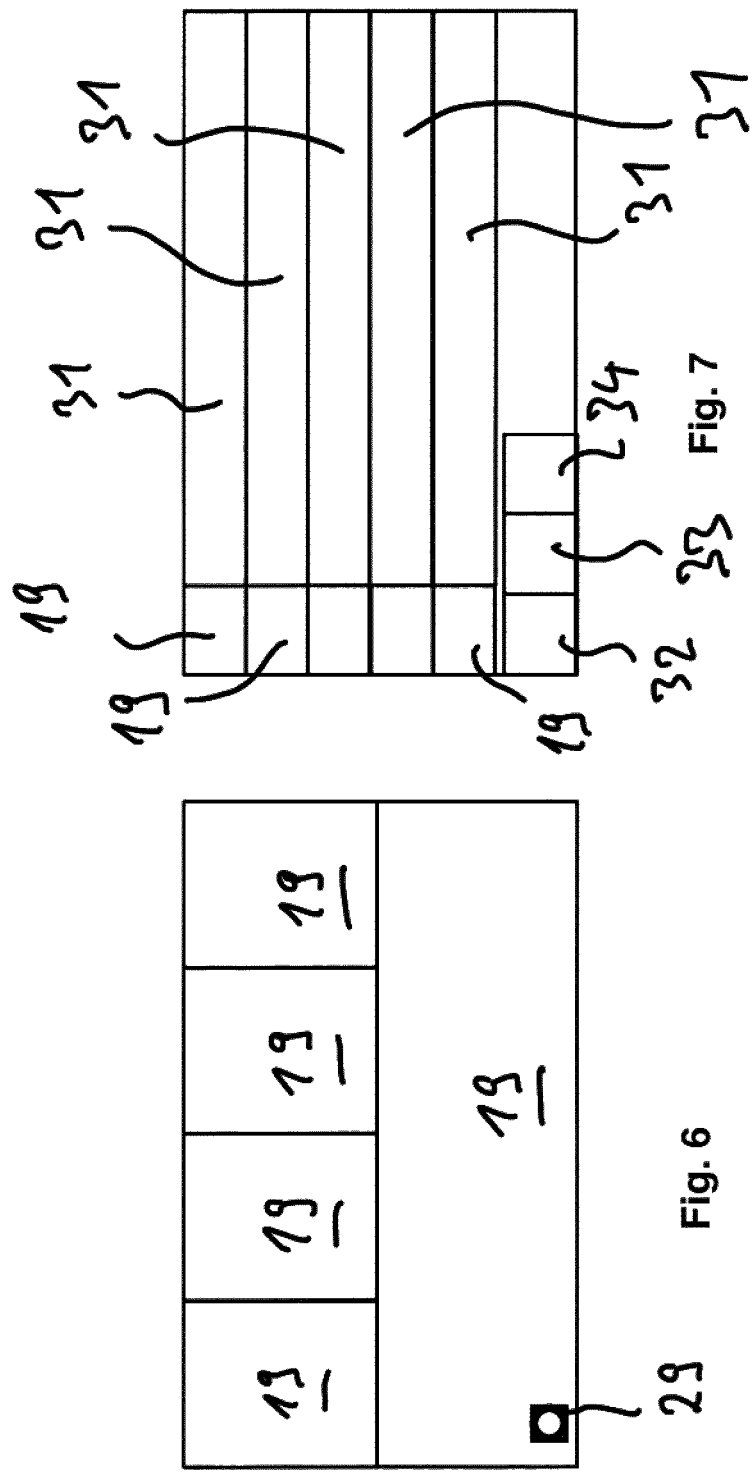

METHOD FOR OBSERVING WORKING PROCESSES OF AN AGRICULTURAL MACHINE, DIGITAL VIDEO SYSTEM AND AGRICULTURAL MACHINE

CROSS REFERENCE

This application claims priority to PCT Application No. PCT/EP2020/067760, filed Jun. 24, 2020, which itself claims priority to German Application No. 10 2019 116961.5, filed Jun. 24, 2019, the entirety of both of which are hereby incorporated by reference.

FIELD OF THE INVENTION

The present invention relates to a method for observing working processes of an agricultural machine, a digital video system for observing working processes of an agricultural machine, and to an agricultural working machine.

BACKGROUND OF THE INVENTION

Analog video systems for observing the crop processing and/or handling working processes of an agricultural machine, in particular of a drawn or self-powered harvester, preferably for potato or beet clearing, have been used for years as assistance systems for the machine driver. A feature of these video systems is that always precisely the video image that the camera assigned to the monitor is recording is displayed on this monitor. Depending on how the camera has been positioned, parts of the machine that are not relevant to the driver are also shown. If the user wants a section of the image to be shown larger, the camera must be laboriously repositioned. Various manufacturers, furthermore, now offer video systems in which a maximum of four cameras can be connected to each monitor, and can then also be displayed simultaneously. Even with these cameras, a more precise observation of the respective parts of the machine is associated with a repositioning of the respective camera.

A vision system for a vehicle is moreover known from EP 3 437 929 A1, in which a display of a field of view or view region of a relevant region closely sur-rounding a trailer is superimposed on the monitor of an operator, depending on the driving situation.

SUMMARY OF THE INVENTION

Against this background, it is the object of the present invention to improve the monitoring of the working processes of a harvester.

In a method according to the invention for observing the crop processing and/or handling working processes of an agricultural machine, in particular a harvesting machine, comprising a digital video system with a plurality of digital image acquisition units, with at least one display unit, and with a network coupling element preferably designed as a switch, via which the image acquisition units are connected to the display unit, the image acquisition units record image data for images, in particular of a video stream. At least one of the images, in particular of the video stream, is reproduced at least partially in one of in particular a plurality of configurable shapes comprising one or multiple image reproduction regions on the display unit, which is in particular designed as a touchscreen, of an EDP unit that is preferably designed as a Panel PC. The image data are transmitted from the respective image acquisition unit via the switch, in particular via an Ethernet switch, to the EDP unit. The respective elements of the digital video system are in particular connected via network cables (Ethernet cables). The physical connection of the image acquisition units to the at least one display unit is thus made indirectly via the EDP unit to which the display unit is connected, or which comprises the display unit. The display unit thus comprises at least one display and the electronics belonging to it.

The image acquisition units are directed here at crop processing and/or handling working processes of the machine, and thus in particular at machine elements, for example at conveyor belts that are conveying the crop, drop steps or the like. Individual cameras can likewise, for example, be directed at separators for separating crop from associated material such as stones or soil, or at drop steps. Digital image acquisition units can likewise, for example, be directed at crop collecting zones (bunkers), crop transfer zones or crop pickup zones. The image acquisition units are, in particular, digital video cameras that output individual images in, for example, RAW format, which also transmit complete, ready-compressed video streams in MPEG or other video formats into the system. Preferably they are high-resolution cameras with a sensor resolution of at least 1280×720 points, preferably of at least 1280×800 points, in particular at least a 1.3 megapixel sensor with, for example, at least 1280×1024 points (pixels).

The data for the images of a video stream can also be present merely as deviations from a previously transmitted image. They are forwarded, as described, in particular via cables, to the network coupling element preferably designed as an Ethernet switch that forwards the data of the image acquisition units via one or multiple network coupling elements to a data-processing EDP unit, preferably a Panel PC. The data are made available there for the display unit in accordance with a configuration, wherein the configuration can be preset by the operator or also standardized by the program. The image data for the images of a video stream are prepared in the EDP unit in such a way that they can be reproduced on the display unit, in particular designed as a touchscreen, of the EDP unit, in particular designed as a Panel PC, and that this is done in the respective image reproduction zone of a defined shape. The arrangement of one or multiple image reproduction regions on the available screen surface of the display unit is referred to as a shape.

The connecting cables are in particular Ethernet cables, for example in the form of 100 BASE-TX or 1000 BASE-TX cables, via which sufficient quantities of data are transferred. Individual components of the video system, in particular of the Ethernet switch and of the EDP unit, are preferably provided with a gigabit Ethernet interface in order to transfer the quantity of data to be processed as effi-ciently as possible.

The reproduction regions of a shape can be configured in such a way that they reproduce identical images, i.e. the same video stream. Preferably a total of up to eight image reproduction regions can be displayed in one shape, meaning that up to eight video streams can be reproduced simultaneously. The EDP unit is in particular equipped for this purpose with appropriately powerful graphics processors and/or microprocessors. The EDP unit moreover comprises the usual means for storing and processing data, in particular working and data memory, controllers, network interfaces and, if relevant, communication interfaces. Further possible details of the EDP unit are moreover described below in connection with the respective developments according to the invention.

The configuration of the shapes and of the image reproduction regions can be stored in the EDP unit in a form that can be stored and appropriately recalled, so that the visible region of the display unit, which preferably is at least 12 inches in size, can be configured personally for a machine operator, a service technician or other operating personnel.

In one development of the invention, information relating to the machine type can be transmitted via an interface for machine control which can likewise be connected to the switch and, moreover, to the EDP unit. This then leads to an initial selection or provision of corresponding shapes that can be stored in a pre-configured manner. A standardized shape can likewise be made available for un-known machine types that are not stored in the EDP unit. It is likewise possible to read individual shape configurations in through an interface present in the EDP unit and by means of a portable storage medium, or to export them onto this storage medium.

The operating personnel now have the possibility, according to the invention, of being shown precisely the desired video images out of the large number of possible window arrangements, in particular with portrait and landscape format displays, on the display unit or its screen. A machine operator can thus set different emphases in the observation of the working processes, in particular for different ground conditions. For example, under heavy, wet soil conditions, parts of a harvesting machine that are liable to become clogged can be specifically moni-tored, whereas in the presence of finer, drier and lighter ground conditions, the separation of the crop into different batch sizes can, for example, receive closer monitoring.

As a result of setting this emphasis, the operating personnel are able to recognize critical machine states more quickly and to then rectify them using the machine controller which, in particular, is not connected to the digital video system. The digital video system can as a result be retrofitted more easily into existing machines.

The processes observed by the digital video system are, in particular, processes taking place "inside" the machine; there are thus not only image acquisition units directed at the exterior surroundings of the machine, but there are also image acquisition units directed at machine elements handling and processing the crop. Handling the crop also refers to its storage in a bunker of the machine.

The images of one of the image acquisition units are preferably in each case at least partially reproduced simultaneously in multiple image reproduction regions of a shape, wherein different regions of interest of the image acquisition unit are defined in advance, and can each be reproduced in a dedicated reproduction region of this shape. Until now, one video stream could only ever be reproduced in one reproduction region of the screen. By transmitting data packets simultaneously to multiple participants (multicast) in the EDP unit, the data are now provided for at least two reproduction regions. The video streams can here be subjected to further computation in another high-performance image processing unit.

The definition of the regions of a video stream that are to be reproduced can take place according to the invention via the touchscreen during operation of the system, or in a configuration template on the basis of a still image. Using, for example, an image region for one-finger or two-finger gestures similar to those known from mobile telephones, image regions can here be selected as a region of interest and then appropriately displayed, in particular in their own image reproduction region.

If a corresponding segment is to be displayed in the identical image reproduction region, the system is technically designed so that the selected image section (region of interest) is displayed in magnified form. The images of the image acquisition unit (or their display) can thus be zoomed within the respective image reproduction region of a shape. The selection of the region of interest is thus associated with zooming in to the respective image segments, in particular through a two-finger input. The different video streams can thus be specifically displayed, in segments if relevant, in enlarged form, so that an even better observation of particularly critical working regions is possible. Thus, for example, in the case of image acquisition directed as a whole at a separating stage, it is possible to deliberately zoom in to an input region and an output region, and for a total of three image reproduction regions (overall view, input region, output region) then to be displayed in each case in enlarged form in the same shape.

The images or image segments selected within the respective image reproduction region can preferably be stored in a memory unit. This can be present locally in the EDP unit, for example in the form of a volatile permanent memory; it is also possible for a portable storage medium that can be connected via a suitable interface of the EDP unit to be used.

The system is furthermore preferably configured in such a way that a selection menu is displayed as a result of a touchscreen input on the corresponding image reproduction region, by means of which storage of the video stream displayed at the time (in particular including regions that are zoomed and conse-quently partially displayed) can be initiated. Alternatively or in addition, this pro-cess can similarly be initiated through a general settings menu which may have submenus.

The system is, furthermore, preferably configured such that two or more image reproduction regions, in particular all the image reproduction regions, and the video streams shown simultaneously in them, also preferably in the arrangement that is visible on the screen, in particular on a portable medium, are stored so that working processes taking place simultaneously at different locations on the machine can also be observed simultaneously, including subsequently, without it being necessary for this purpose to attend to separate video streams displayed simultaneously next to one another. The EDP unit thus offers the conven-ient creation of a common video stream on the basis of the contents shown on the display unit. "Portable medium" refers to storage media that can be connected temporarily to the EDP unit via a hardware interface, not being necessary for the operation of the EDP unit, and in particular only used for data transport. This can, for example, be a USB stick. It can, however, also refer to a cloud memory that is preferably provided by the machine manufacturer and is available via interfaces of the machine and/or of the tractor.

The observation and supervision of the working processes is in particular improved if images of the video stream of an image acquisition unit, temporarily stored in a preferably volatile or semi-permanent buffer memory, are reproduced in a slowed down manner in at least one image reproduction region, in particular wherein the same video stream is not reproduced, in full or zoomed, in a further image reproduction region of the same shape, or is slowed down differently. The incoming video stream is here slowed down in particular to 25% of real-time, wherein, after a time that is in particular predefinable, for example after 4 sec-onds, a jump is made in the reproduction to what is then the current image, after which the subsequent video stream is correspondingly again reproduced in a slowed down manner. This permits very good monitoring of machine parts that in particular are moving quickly, in particular rotating.

The system is, in particular, designed in such a way that slowed-down video streams are reproduced in at least two image reproduction regions of a shape.

Preferably the images, in particular configured as a video stream, of one or multiple image reproduction regions and/or image acquisition units, are transmitted wirelessly by means of a communication unit that is in particular connected via an additional switch, for example an Ethernet switch, to a remote and in particular mobile terminal device or user terminal device. In addition to the transmission of the image to the monitor or the display unit in the cab of the tractor or self-propelled vehicle, it is thus possible to transmit the video image to a mobile terminal device. The user of the terminal device connects his mobile terminal device for this purpose preferably to a WLAN that is provided by a communication unit of the machine. Then, in a program launched on the mobile terminal device, the terminal device user can display individual shapes adapted to the terminal device with at least one video stream of one of the plurality of image acquisition units. Alternatively he can access a web page of the digital video system, preferably hosted on the EDP unit, by way of which an in particular configurable shape is made available for a remote, in particular mobile, user terminal device, wherein preferably the image reproduction regions are likewise predefined on the server side and/or are configurable.

It is thus easy, for example for drivers of collection vehicles, to display an image reproduction segment that shows the video stream of a bunker filling in a shape. The working safety and the convenience of potato harvesters can also be improved in this way for harvesting personnel who work at a harvesting table during harvesting, in that the harvesting personnel on the harvester are shown the video image of the separators, which cannot be seen from the harvesting table. Any settings can then be made directly by the operating personnel from the harvesting table operating terminal, wherein the result of the adjustment can be seen directly on the mobile user terminal device. The driver is thus relieved of supervision and control tasks, and can thereby concentrate on driving the harvester. Managers of agricultural businesses can similarly check the way the machine is operating during the harvesting, for example, without having to mount the machine. The reproduction on a remote, in particular mobile, user terminal device takes place in particular without interfering with the reproduction on the display unit in the driver's cab.

The images of one or multiple image reproduction regions of a shape, in particular all image reproduction regions, are advantageously stored in such a way that respectively sequential clips of a preferably adjustable length are created or stored. Due to the limitation on the size of the resulting clips associated with this, said clips preferably being automatically provided with a timestamp in the name, the subsequent editing and viewing of individual clips that were created at specific, for instance critical, time points is possible more easily.

It should be clear that method steps described above and below can be realized by means of a computer program which runs in a working memory of the EDP unit. It is also possible that there are multiple interacting programs that run in the same EDP unit or in the same memory or in different memories of the EDP unit, for example a CPU and a GPU.

Preferably, one of up to at least 24 image acquisition units, in particular digital cameras, preferably up to a maximum of 48 image acquisition units, connected to one another via multiple switches connected in series, is selected in a configuration step for an image reproduction region. Due to cascading the switches, the system can be extended, in particular also easily subsequently extended, if corresponding ports for at least one further switch are kept free on each switch. To avoid data bottlenecks on the transmission cable, the bandwidth required in the network of the digital video system is preferably reduced, in that only the cameras displayed in the currently active shape are streamed.

Preferably, depending on a deviation from normal operation detected by a machine controller, on the activation of machine functions, and/or on changes to the machine settings made via an operating terminal, a corresponding screen signal is displayed overlaying the previous image reproduction regions and/or reproducing at least one associated machine element in an image reproduction region. A shape can be changed automatically for this purpose. An interface to the machine controller is again necessary for this method, again provided via the Ethernet switch, a further Ethernet switch, or by a direct connection to the EDP unit. The respective screen signal can in particular be reproduced in a shape configured only for this. The operating terminal is typically located in the driver's cab as well as, for example, at a harvesting table of a potato harvester.

Preferably, in the event of a deviation from normal operation, the activation of machine functions, and/or changes to the machine settings, an automated changeover from one or multiple video streams to a shape configured for this purpose thus takes place. One or multiple image segments, preferably in the form of regions of interest of one or multiple video streams, is then displayed in this, so that the operating personnel are purposefully informed about the poten-tially critical situation, and can introduce countermeasures or checks on this basis. A color-based emphasis is preferably applied at the same time, in particular when there is a deviation from normal operation or in critical operating states, for example when individual regions are under excessive load. A slowed-down reproduction of the relevant video stream can also take place in such a shape, in particular for fast moving or rotating machine parts. It is, similarly, advantageous according to the invention if such an overlay or display of a shape can be hidden again by a screen input, in particular in the form of a swipe movement, in order to return to the previous view or the previous shape.

The video streams must be displayed with the lowest possible latency time (delay time) between the camera lens and the display unit. Delay times<100 ms are desirable. A time is advantageously assigned to individual images for this purpose. For this purpose, at least a plurality of the images can be provided with a timestamp at one component, and the time at a further component of the (digital video) system can be taken and/or the time on receipt of a recognizable image is recorded at various components of the system, so that if the time delay is too long the associated image reproduction region can be marked, for example made black and/or given a red exclamation mark.

Preferably, at the display unit, which also simultaneously represents the operating unit, an animated graphic is shown (a rotating cogwheel, for example) in order to make it clear that the system is working properly and has not stopped (frozen).

Similarly, a pop-up dialogue is in an advantageous manner first opened for the configuration of one of the image reproduction regions, representing the active image reproduction region at a reduced size, preferably before settings can be made. This provides reassurance and checking of the desired changes that are to be carried out, so that a different image reproduction region is not configured accidentally. The vibrations that often occur in field work thus do not lead to, or lead to fewer, unwanted inputs on a display unit designed as a touchscreen.

According to a further advantageous design of the invention, the shapes comprise at least one and preferably up to eight in particular rectangular image reproduction regions, wherein preferably an arrangement of the image reproduction regions is proposed depending on the size and shape of the selected regions of interest and/or the position of the image acquisition units in the material flow of the harvested material by means of an algorithm available on the EDP unit. This is a simple optimization problem for the optimum exploitation and arrangement of the available surface area, if the operating personnel want to leave this to the system.

In the case of a plurality of shapes, it is advantageous in a further exemplary embodiment of the invention if the shapes are switched automatically, in particular at predefinable time intervals, in order to provide a sequential view into various machine regions.

Predefined shapes are advantageously furthermore used depending on signals provided to the machine controller for the operating states of road travel, field work and reversing. Thus, for example, when traveling on the road, a shape that provides a view of any machine parts that should be folded in or raised is displayed, whereas for field work, the desired working processes that vary the flow of material are correspondingly observed. Similar considerations apply to the shape views when reversing.

The images of at least one image acquisition unit are also advantageously displayed as a web video stream via a remote connection, in particular wherein the resolution of the shape view or the repetition frequency is adapted to the bandwidth of the connection that is, for example, reported by a mobile terminal device. This system can also be realized on the EDP unit, entirely independently of the display on the display unit, in order to avoid disturbing the operating personnel.

The system is in particular not designed for machine control, meaning that it does not manipulate the controller of the machine, but serves solely for monitoring the processes.

The object presented at the beginning is also achieved by a digital video system for observing the crop processing and/or handling working processes of an agricultural machine, in particular a harvesting machine, comprising a plurality of digital image acquisition units and at least one display unit designed as a touchscreen of an EDP unit designed in particular as a Panel PC, and which is provided with a network coupling element designed preferably as a switch, in particular an Ethernet switch, via which the image acquisition units are connected to the display unit. The system here is designed for carrying out a method as cited above, by means, as described above, of one or multiple computer programs.

For the sake of scalability of the system it is preferably provided with a plurality of network coupling elements in the form of (Ethernet) switches, wherein at least one image acquisition unit is connected to the EDP unit via the switches networked in series.

Preferably, when a camera is exchanged, this is automatically recognized, configured and returned to operation by the system, in particular when the ex-change is of an original part.

The transmission of the desired signals to a machine controller can in particular be realized in an improved way if the switch that is directly connected to the EDP unit is connected to an interface for a CAN bus and/or a communication unit of the machine. Alternatively, a CAN bus or a communication unit can also be connected directly to the EDP unit if this is provided with suitable interfaces.

The object presented at the beginning is likewise achieved through an agricultural working machine, in particular a harvesting machine, comprising a video system as described above or below.

BRIEF DESCRIPTION OF THE DRAWINGS

Reference is now made more particularly to the drawings, which illustrate the best presently known mode of carrying out the invention and wherein similar reference characters indicate the same parts throughout the views.

FIG. 6 shows a further shape.

FIG. 7 shows an associated configuration view for the shape of FIG. 6.

DETAILED DESCRIPTION OF THE DRAWINGS

Individual technical features of the exemplary embodiments described below can also be used in combination with exemplary embodiments described above as well as the features of the independent claims and any further claims related to objects of the invention. To the extent it may be helpful, elements with the same functional effect are given identical reference signs.

Figure 1:
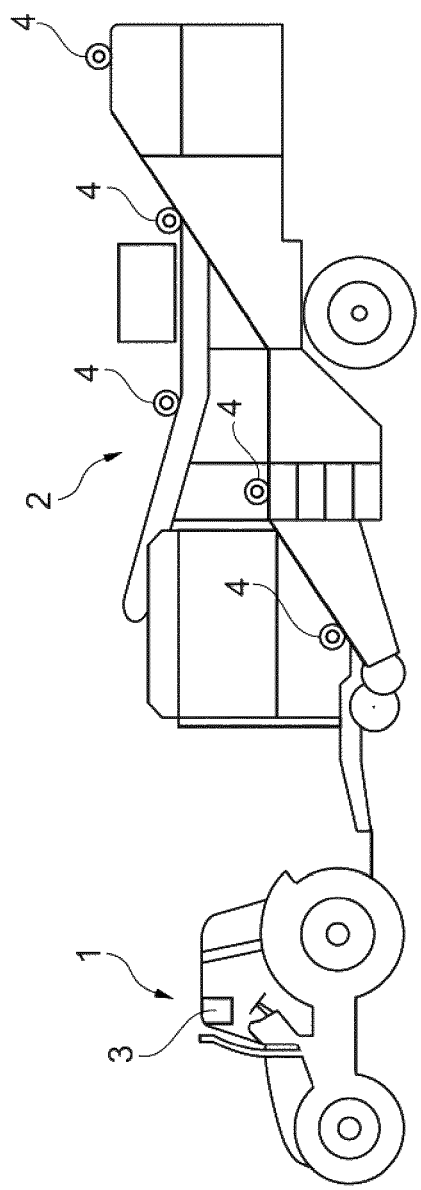
FIG. 1 shows an object according to the invention in the form of a drawn harvesting machine.

An apparatus according to the invention is designed according to FIG. 1 as a harvesting machine 2 drawn by a tractor 1 and designed as a potato harvester. An EDP unit belonging to the harvesting machine 2 according to the invention is arranged with a display unit 3 designed as a touchscreen in a driver's cab 5 of the tractor 1. This is connected to a switch on the harvesting machine side via an Ethernet cable, not shown. The image data recorded by digital image acquisition units 4 which, in the present case, are assigned schematically to individual handling stages for the harvested material, are reproduced on the display unit 3.

The image acquisition units 4 are digital cameras which generally in systems according to the invention transmit the data over Ethernet cables 6 to a switch 7 that is designed as an Ethernet switch. From there, the data are then transmitted to an EDP unit designed as a Panel PC 8, again preferably via Ethernet cable 6. A further Panel PC 8 can optionally be connected, on whose display unit a range of configurable shapes can also be displayed. In an associated configuration program of a main Panel PC (master) it is then possible to select which of the cameras are displayed on this PC and which on the subsidiary, optional Panel PC (the slave, connected via a data line in the form of a dashed Ethernet cable 6).

An interface for machine control in the form of a CAN to Ethernet gateway 9 is also present. Access to WLAN and to a machine control unit 12 connected via a CAN bus line 11 is provided through this. It is also, for example, possible to access a corresponding bus system in parallel via an ISO bus line 13 (shown dashed). In this case, the gateway 9 also comprises a corresponding ISO bus interface.

Figure 2:
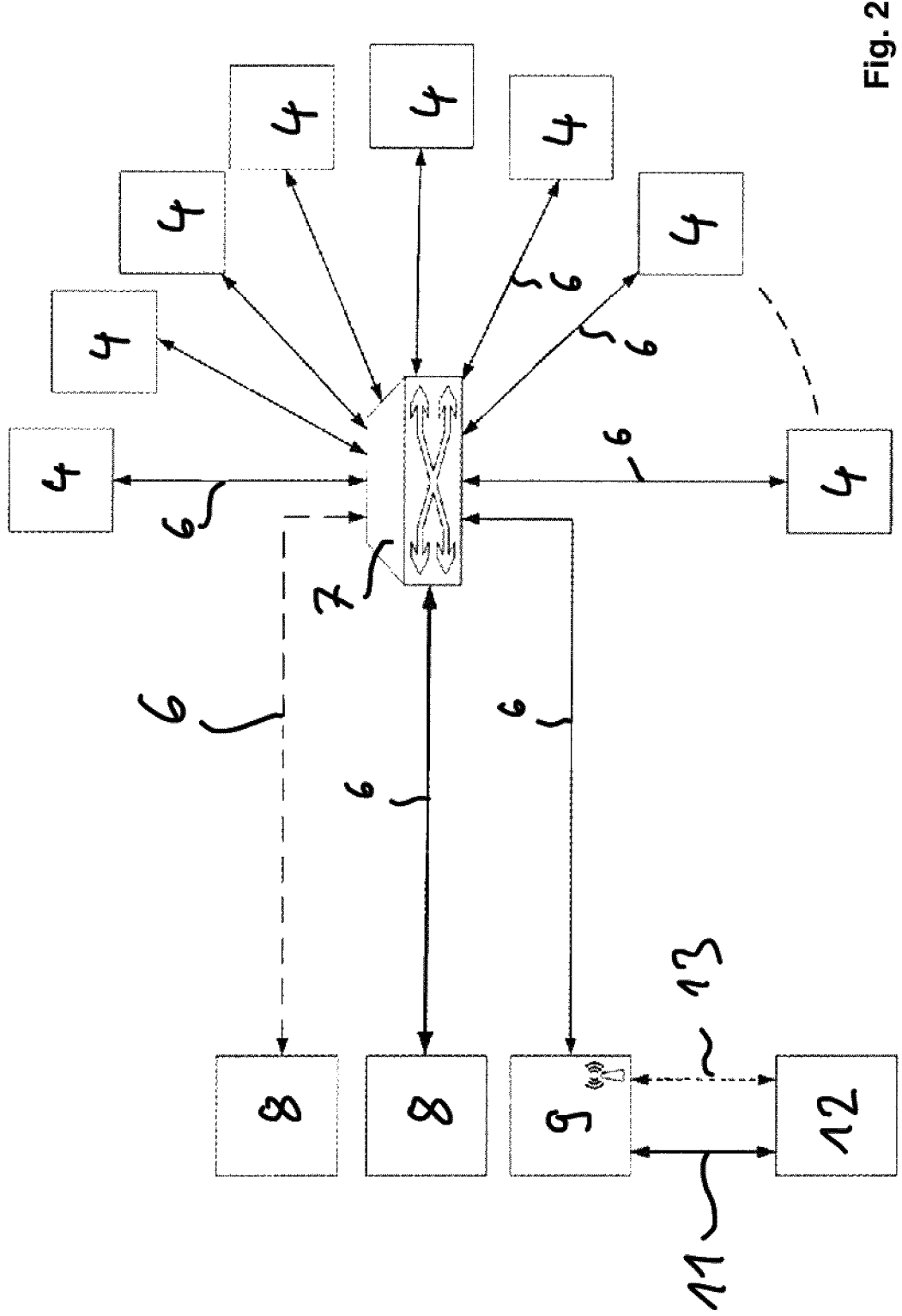
FIG. 2 shows components of the object according to the invention of FIG. 1.
Figure 3:
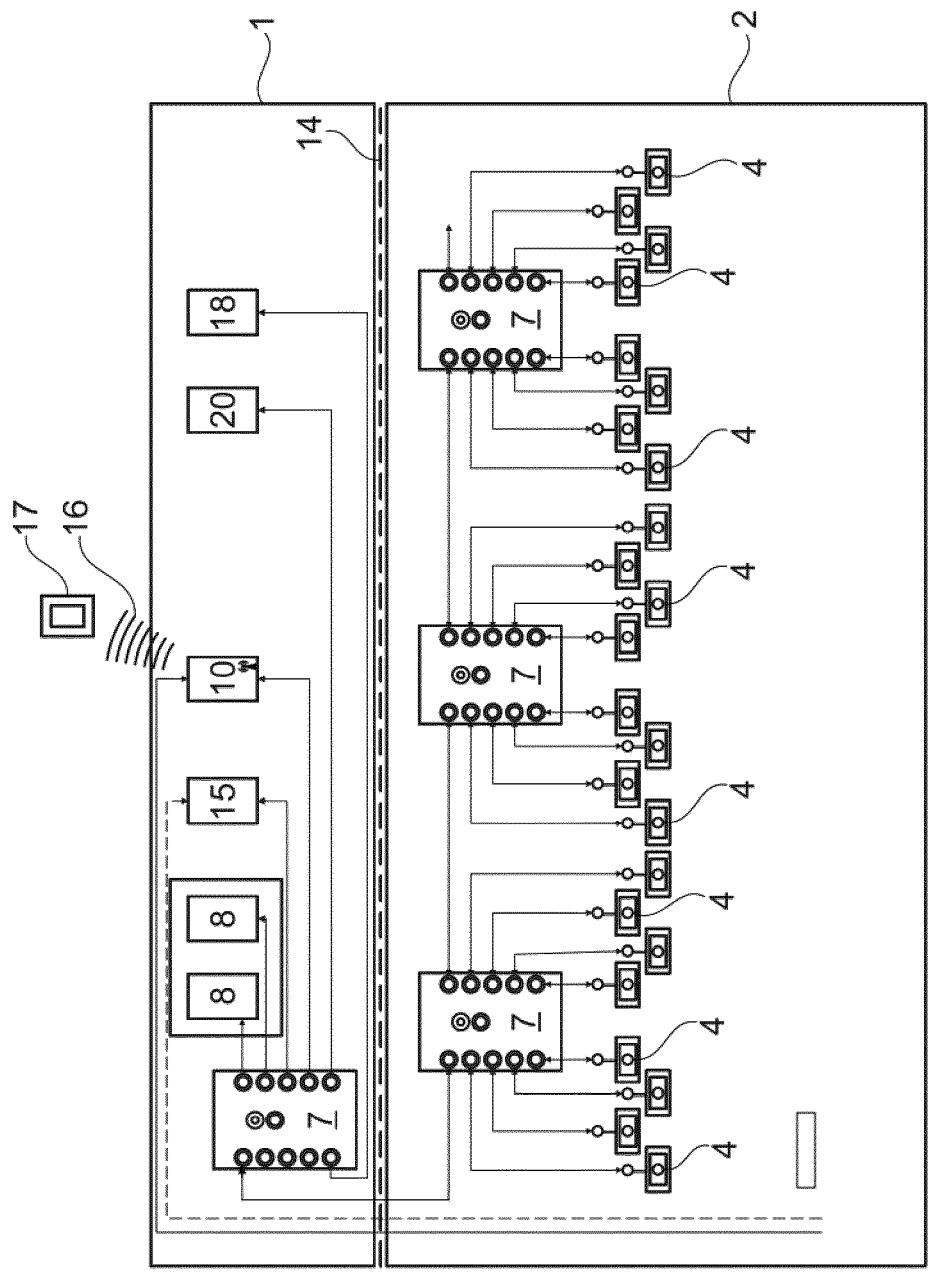
FIG. 3 shows a further object according to the invention.

Whereas according to the exemplary embodiment of FIG. 2 the digital image acquisition units 4 are only connected to one Ethernet switch 7, which in the case of a drawn harvesting machine 2 is preferably arranged on the harvesting machine side, the variant embodiment according to FIG. 3 comprises a total of four switches 7, of which the upper one in the figure is assigned to the tractor 1, while the switches 7 that are directly connected to the digital image acquisition units 4 are arranged on the side of the harvesting machine 2. A dashed line 14 indicates the separation of the tractor 1 and the harvesting machine 2, illustrated as boxes in the figure.

Figure 4:
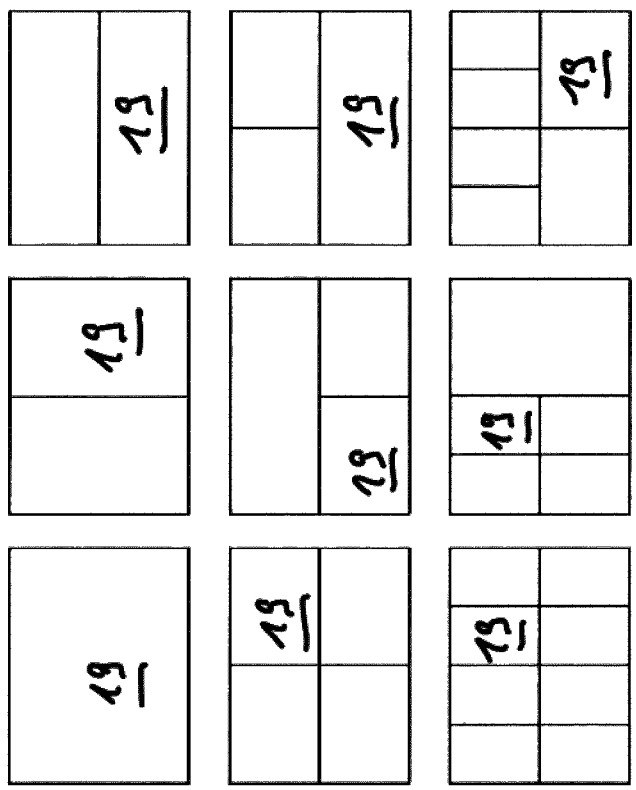
FIG. 4 shows nine variations of shapes.

The optical image acquisition units 4 arranged in FIG. 4 at the right-hand switch 7 on the harvesting machine side are thus then connected via a total of four switches 7 to a master Panel PC 8 on the left in the figure and to a further Panel PC (slave) 8 located adjacently on the right in the figure. An ISO bus interface 15 is also present in this exemplary embodiment. Machine signals or control signals are received via this, and they, depending on the type of the signal, lead to automatic activation of a shape attracting the attention of the machine driver, via which a video stream of an optical image acquisition unit 4 assigned to the control signals is displayed on the display unit. The same applies for a CAN to Ethernet gateway 10. This is placed in the settings of the program running on the EDP unit.

A router that can be connected via the gateway 10 provides a WLAN connection 16 to a remote and mobile user terminal device 17, on which shapes can also be configured or retrieved by a web server running on the master Panel PC. A diagnostic interface 18 and one or multiple further devices 20 that convey control signals can additionally be connected to the tractor-side Ethernet switch 7.

In a configuration program segment, i.e. the settings of a software program running on the master Panel PC 8, the nine shapes represented in FIG. 4 can, for example, be configured. Between one and eight image reproduction regions 19 can thus be furnished with video streams of the optical image processing units 4.

Figure 5:
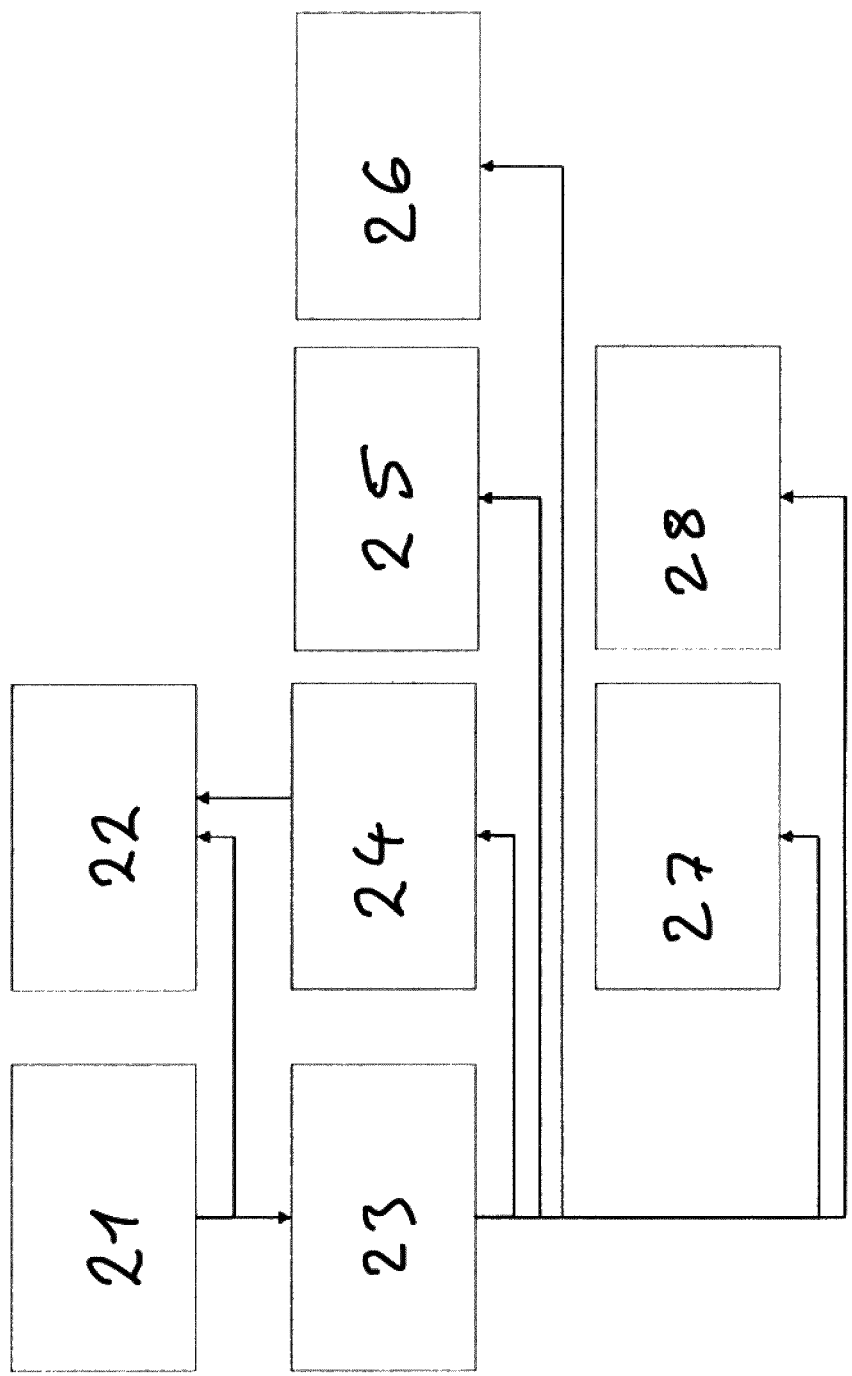
FIG. 5 shows program levels of a computer program that enables the method according to the invention.

In the exemplary embodiment of FIG. 5, levels of an associated computer program are illustrated for the illustrated exemplary embodiment. A working view 21 for the respective shapes is located in the upper left, from where individual image reproduction regions 19 can be edited according to box 22. An input facility on the touchscreen is assigned, moreover, to the working view 21, via which the operating personnel reach a settings level 23 from where a shape management 24, a camera management 25, a sequence management 26, a web server management 27 and user settings 28 can be reached.

The shapes are configured in the shape management 24. Settings, if present, of the image acquisition units 4, for example the color configuration, com-pression or resolution, can be made in the camera management 25. The sequence management 26 allows the saving of individual image reproduction segments 19, or the management of the individual video streams. A web page repre-sentation of individual shapes is correspondingly configured in the web server management 27; an access management can, in particular, be configured here, with which third parties can only log on to the web server of the EDP unit with a password from a user terminal device that is preferably mobile, or is at least remote from the harvesting machine. Finally, the user profile can be stored or opened in the user management 28. It is also possible to set whether the system always starts up with the most recently used user profile, or with a standard configuration.

According to the exemplary embodiment of FIG. 6, a shape is designed for the reproduction of five video streams on the basis of the five image reproduction regions 19. The associated configuration interface of the shape can be opened directly by means of a correspondingly assigned icon 29. Here, according to FIG. 7, individual image reproduction regions 19 are again first formed, and, while these are reduced in size, they correspond otherwise to those of FIG. 6. The top-most image reproduction region 19, for example, shows the video stream of the upper left image reproduction region in FIG. 6 at a reduced size, the image reproduction region 19 located in FIG. 7 below the image reproduction region in the second row shows the second video stream in the upper row from the left according to FIG. 6, and so on. The occupancy of the image reproduction regions 4 with the optical image acquisition units 4 that are available is made by the finger-operated field 31. Tapping this field, or the further fields 31, displays a drop-down list where the cameras known to the system can then be selected. The regions of the touchscreen located on the lower left in FIG. 7 are a button for returning to the previous dialogue (button 32), a help button 33, and an information button 34.

The invention claimed is:

1. A method for observing the crop processing and/or handling working processes of an agricultural machine, the method comprising the steps of:
   recording, via at least one of a plurality of image acquisition units of digital video system, image data for images;
   reproducing at least one of the images at least partially in at least one configurable shape comprising one or more image reproduction regions of a display unit of the digital video system;
   wherein the one or more shapes are configurable by an operator of the agricultural machine, and wherein a shape is an arrangement of one or multiple image reproduction areas of an available screen surface of the display unit;
   wherein, depending on a deviation from normal operation detected by a machine controller, on the activation of machine functions, and/or on changes to machine settings made via an operating terminal, a corresponding screen signal is displayed overlaying the previous image reproduction regions and/or reproducing at least one associated machine element in an image reproduction region.

2. The method as claimed in claim 1, wherein the images of one of the at least one of the plurality of image acquisition units are in each case at least partially reproduced simultaneously in multiple image reproduction regions of a shape.

3. The method as claimed in claim 2, wherein the images of the at least one of the plurality of image acquisition unit can be zoomed within the respective image reproduction region of a shape.

4. The method as claimed in claim 1, wherein the images or image segments selected within the respective image reproduction region are stored in a memory unit.

5. The method as claimed in claim 1, wherein the images are of a video stream of a said image acquisition unit, are temporarily stored in a buffer memory, and are reproduced in a slowed down manner in at least one image reproduction region.

6. The method as claimed in claim 5, wherein slowed down video streams are reproduced in at least two image reproduction regions.

7. The method as claimed in claim 1, wherein the images of one or multiple image reproduction regions and/or image acquisition units are transmitted wirelessly by means of a communication unit connected.

8. A method for observing the crop processing and/or handling working processes of an agricultural machine, the method comprising the steps of:
   recording, via at least one of a plurality of image acquisition units of digital video system, image data for images;
   reproducing at least one of the images at least partially in at least one configurable shape comprising one or more image reproduction regions of a display unit of the digital video system; wherein the one or more shapes are configurable by an operator of the agricultural machine, and wherein a shape is an arrangement of one or multiple image reproduction areas of an available screen surface of the display unit,
   wherein the images of one or multiple image reproduction regions of a shape, are stored a medium which is connected to the system via a hardware interface, wherein respective sequential clips of a preferably adjustable length are created.

9. A method for observing the crop processing and/or handling working processes of an agricultural machine, the method comprising the steps of:
   recording, via at least one of a plurality of image acquisition units of digital video system, image data for images;
   reproducing at least one of the images at least partially in at least one configurable shape comprising one or more image reproduction regions of a display unit of the digital video system;
   wherein the one or more shapes are configurable by an operator of the agricultural machine, and wherein a shape is an arrangement of one or multiple image reproduction areas of an available screen surface of the display unit,
   wherein in a configuration step for an image reproduction region one of up to at least 24 image acquisition units is selected, said units being connected to one another via multiple switches connected in series.

10. A method for observing the crop processing and/or handling working processes of an agricultural machine, the method comprising the steps of:
    recording, via at least one of a plurality of image acquisition units of digital video system, image data for images;
    reproducing at least one of the images at least partially in at least one configurable shape comprising one or more image reproduction regions of a display unit of the digital video system; wherein the one or more shapes are configurable by an operator of the agricultural machine, and wherein a shape is an arrangement of one or multiple image reproduction areas of an available screen surface of the display unit,
    wherein in an event of a deviation from normal operation, activation of machine functions, and/or changes to machine settings, an automated changeover from one or multiple video streams to a shape configured for this purpose takes place.

11. A method for observing the crop processing and/or handling working processes of an agricultural machine, the method comprising the steps of:
    recording, via at least one of a plurality of image acquisition units of digital video system, image data for images;
    reproducing at least one of the images at least partially in at least one configurable shape comprising one or more image reproduction regions of a display unit of the digital video system;
    wherein the one or more shapes are configurable by an operator of the agricultural machine, and wherein a shape is an arrangement of one or multiple image reproduction areas of an available screen surface of the display unit,
    wherein at least several of the images are provided with a timestamp, or the time at reception of a respective image at various components of the system is recorded, in order to mark the associated image reproduction region in the event of an excessive time delay.

12. The method as claimed in claim 1, wherein a pop-up dialogue representing the active image reproduction region at a reduced size is first opened for the configuration of one of the image reproduction regions.

13. The method as claimed in claim 1, wherein the shapes are automatically switched.

14. The method as claimed in claim 1, wherein predefined shapes are used, depending on the signals transmitted from a machine controller for the operating states of road travel, field work and reversing.

15. A method for observing the crop processing and/or handling working processes of an agricultural machine, the method comprising the steps of:
    recording, via at least one of a plurality of image acquisition units of digital video system, image data for images;
    reproducing at least one of the images at least partially in at least one configurable shape comprising one or more image reproduction regions of a display unit of the digital video system;
    wherein the one or more shapes are configurable by an operator of the agricultural machine, and wherein a shape is an arrangement of one or multiple image reproduction areas of an available screen surface of the display unit,
    wherein, by means of a web page of the digital video system preferably hosted on an EDP unit, a shape is made available for a remote user terminal device.

16. The method as claimed in claim 1, wherein the images of at least one image acquisition unit are displayed as a web video stream via a remote connection.

17. The method as claimed in claim 1, wherein the system is not designed for machine control.

18. A digital video system for observing crop processing and/or handling working processes of an agricultural machine, the system comprising:
    a plurality of digital image acquisition units,
    at least one display unit, and
    a network coupling element, via which the image acquisition units are connected to the display unit,
    wherein the system is designed to carry out the method as claimed in claim 1.

19. The digital video system as claimed in claim 18, further including a plurality of switches as network coupling elements, wherein at least one image acquisition unit is connected to at least one display unit in the form of an EDP unit via the switches that are connected in series.

20. The digital video system as claimed in claim 18, wherein the switch that is directly connected to at least one display unit in the form of an EDP unit is connected to an interface for a CAN bus and/or a communication unit.

21. An agricultural working machine including a digital video system as claimed in claim 18.

\* \* \* \* \*

UNITED STATES PATENT AND TRADEMARK OFFICE
CERTIFICATE OF CORRECTION

PATENT NO. : 11,963,477 B2
APPLICATION NO. : 17/622016
DATED : April 23, 2024
INVENTOR(S) : Markus Witte, Wolfram Strothmann and Axel Schomaker It is certified that error appears in the above-identified patent and that said Letters Patent is hereby corrected as shown below:

In the Specification

Column 1, Line 43, delete the term "sur-rounding" and replace with -- surrounding --

Column 2, Line 53, delete the term "effi-ciently" and replace with -- efficiently --

Column 3, Line 12, delete the term "pre-configured" and replace with -- preconfigured --

Column 3, Line 13, delete the term "un-known" and replace with -- unknown --

Column 3, Line 29, delete the term "moni-tored" and replace with -- monitored --

Column 4, Line 30, delete the term "conse-quently" and replace with -- consequently --

Column 4, Line 31, delete the term "pro-cess" and replace with -- process --

Column 4, Line 44, delete the term "conven-ient" and replace with -- convenient --

Column 4, Line 64, delete the term "sec-onds" and replace with -- seconds --

Column 6, Line 33, delete the term "poten-tially" and replace with -- potentially --

Column 7, Line 62, delete the term "ex-change" and replace with -- exchange --

Column 9, Line 55, delete the term "com-pression" and replace with -- compression --

Column 9, Line 59, delete the term "repre-sentation" and replace with -- representation --

Column 10, Line 11, delete the term "top-most" and replace with -- topmost --

Signed and Sealed this
Fourth Day of June, 2024

Katherine Kelly Vidal
*Director of the United States Patent and Trademark Office*